United States Patent
Fitzgerald

[15] 3,653,510
[45] *Apr. 4, 1972

[54] OIL SKIMMING METHOD AND APPARATUS

[72] Inventor: Hugh J. Fitzgerald, Austin, Tex.
[73] Assignee: Ocean Pollution Control, Inc., Dallas, Tex.
[ * ] Notice: The portion of the term of this patent subsequent to Aug. 11, 1987, has been disclaimed.
[22] Filed: Apr. 27, 1970
[21] Appl. No.: 32,187

Related U.S. Application Data
[63] Continuation of Ser. No. 811,713, Apr. 1, 1969, Pat. No. 3,523,611.

[52] U.S. Cl. ..........................210/83, 210/DIG. 21, 210/242
[51] Int. Cl. ........................................................B01d 21/00
[58] Field of Search.....................210/35, 70, 76, 82, 83, 84, 210/170, 242; 61/1 F, 5

[56] References Cited

UNITED STATES PATENTS 3,508,652   4/1970   Wooley..............................210/83 X
3,523,611   4/1969   Fitzgerald..............................210/242

FOREIGN PATENTS OR APPLICATIONS 1,528,855   6/1968   France......................................61/18

Primary Examiner—Reuben Friedman
Assistant Examiner—T. A. Granger
Attorney—Richards, Harris & Hubbard

[57] ABSTRACT

Apparatus and method for skimming an oil film from the surface of a large body of water including a towed funnel assembly with a flexible cover and side skirts of impermeable sheet material with floats to keep the leading edge of the cover spaced above the surface of the water so that the oil film will pass beneath it, with the remaining portions of the cover supported on the floating oil, a bottom panel of netting to hold the side skirts in downwardly projecting position to confine the oil laterally, while permitting the water beneath it to escape freely, and a sump at the apex of the funnel to receive the oil for transfer to storage vessel.

19 Claims, 5 Drawing Figures

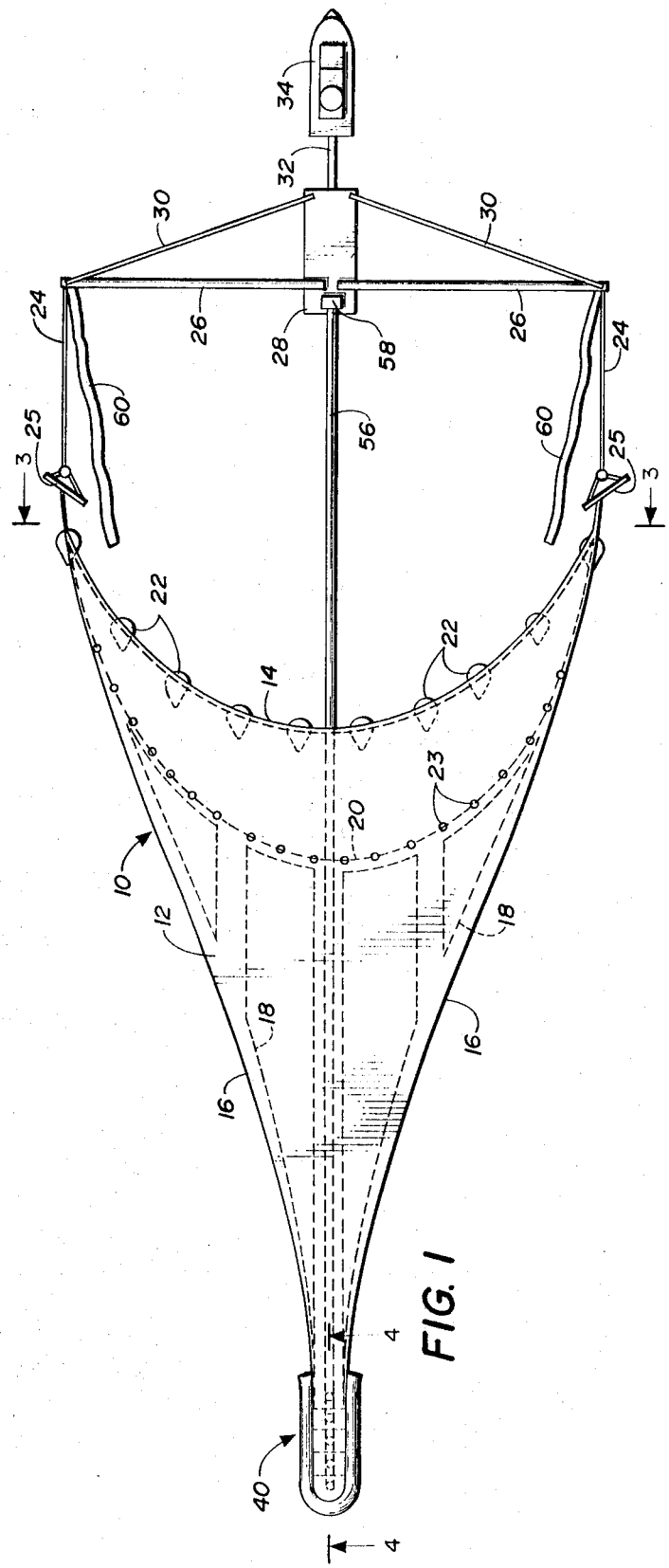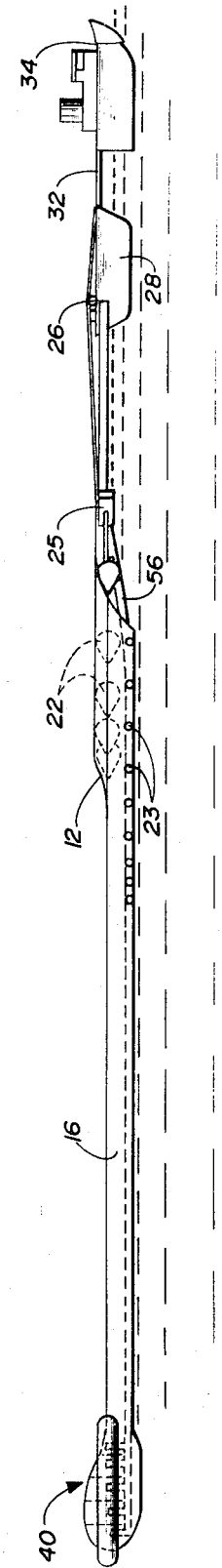

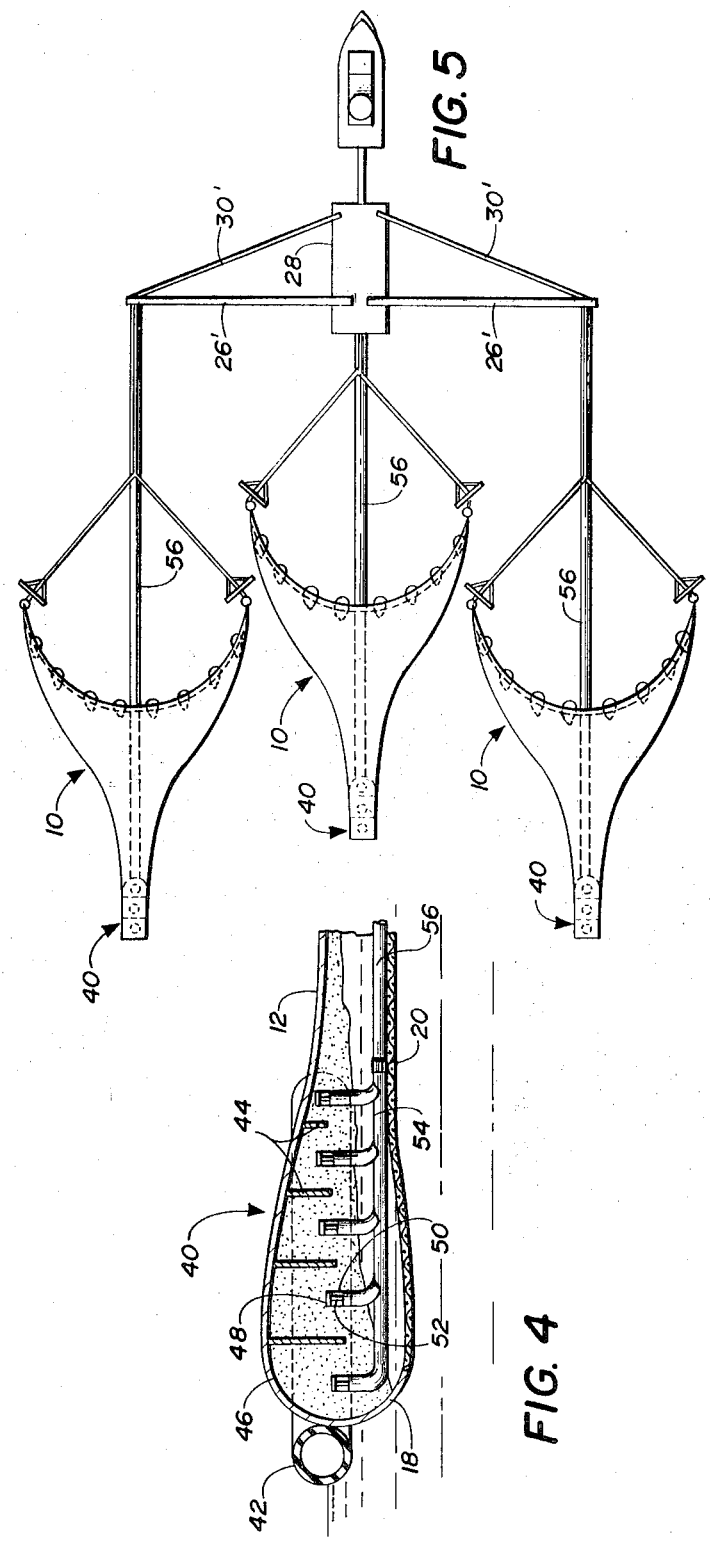
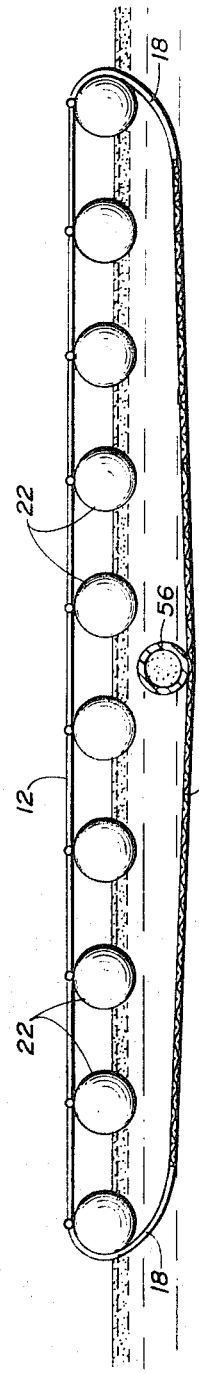
INVENTOR:
HUGH J. FITZGERALD
Richards, Harris & Hubbard
ATTORNEYS

OIL SKIMMING METHOD AND APPARATUS

This application is a continuation of application Ser. No. 811,713, filed Apr. 1, 1969, now U.S. Pat. No. 3,523,611, by the same inventor.

This invention relates to an apparatus and a method for removing an oil film from the surface of a large body of water.

It is well known that when oil is released in or on a large body of water, because of the immiscibility of oil with water and the fact that oil is lighter than water, the oil rises to the surface of the water in the form of a film or slick which spreads to cover a large area and which is capable of migrating considerable distances depending upon the wind and the current. Where large quantities of oil are released, for example due to the sinking or damage of an oil tanker or to escape of oil under pressure through a fissure in an otherwise impermeable formation overlying an oil reservoir or adjacent to the borehole of an off-shore drilling operation, movement of the oil slick to adjacent coastal areas can not only form an unsightly and messy residue on beaches, interfering with their recreational uses, but also have serious effects on aquatic birds, fish and other marine life, as well as other adverse ecological consequences.

Heretofore there has been no effective means for removing large oil films from open bodies of water. Attempts to use detergents and other chemicals to emulsify and/or disperse the oil have for the most part proven ineffective. On the other hand, attempts to skim the oil from the surface by mechanical means, such as a chain of logs connected end to end with the two ends of the chain towed by a pair of tugboats moving on parallel courses, have proved virtually worthless due to the fact that the surface of an ocean, bay or large inland lake is almost invariably subject to waves or choppiness which cause the oil film to be washed over the tops of the logs so that most of the oil escapes. There was also difficulty in maneuvering the tugboats to keep the log chain extended and moving perpendicularly to sweep the surface without allowing the oil to spill from the end of the chain.

The present invention provides a novel apparatus consisting, in general terms, of a tapered funnel assembly having a cover of flexible sheet material substantially impermeable to oil which can be towed by a single boat in a direction perpendicular to the wide end of the funnel with float means to keep the leading edge of the funnel spaced above the surface of the water so that the oil film will pass beneath it. The remaining portions of the cover ride upon the floating film of oil, the flexibility of the cover allowing it to conform readily to the wave motion and chop of the water surface. The funnel is provided at each side with skirt portions of similar flexible, impermeable sheet material, the lower edges of these skirts being attached to opposite edges of a bottom panel of netting which holds the skirts in proper downwardly projecting position to confine the oil laterally while permitting the water beneath it to pass freely through the bottom panel. The tapered shape of the funnel channels the oil rearwardly and inwardly to a sump at the apex of the funnel. This sump is likewise provided at the bottom with a panel of netting to permit the water beneath the oil to move freely out of the sump. The sump is preferably divided by transversely extending vertical partitions into separate chambers to limit movement of water upwardly into the sump due to wave action and turbulence. Flexible oil lines having their input ends respectively positioned in the several chambers of the sump extend forwardly to a storage barge which is located between the funnel assembly and the tow boat.

The present invention also includes a novel method for skimming oil from the surface of a body of water which employs the disclosed apparatus.

This method and apparatus, because of the extreme flexibility of the funnel assembly and its consequent ability to conform to the surface of the water, provides a very efficient means of sweeping the oil film from the surface of the water, allowing little if any of the oil to escape. The apparatus is inexpensive in construction, light in weight and easy to handle and may be towed by a single tow boat with good manueverability and short turning radius. Thus, a large body of water may be effectively cleared of surface oil in a short time at low cost.

In the drawings:

FIG. 1 is a diagrammatic plan view of an illustrative apparatus embodying features of the present invention being towed by a tow boat.

FIG. 2 is a side elevational view, partly in section, of the apparatus of FIG. 1.

FIG. 3 is a transverse sectional view taken generally along the line 3—3 of FIG. 1.

FIG. 4 is a fragmentary vertical sectional view taken generally along the line 4—4 of FIG. 1.

FIG. 5 is a diagrammatic plan view showing an alternative embodiment of the invention in which three funnel assemblies are towed by a single tow boat.

The illustrative apparatus shown in FIGS. 1–4 includes a funnel assembly generally designated 10 which is formed of a cover 12 of flexible sheet material such as closely woven canvas, nylon or dacron which is impervious and impermeable to oil, having a tapered shape with a concave leading edge 14 of caternary shape and tapered trailing edges 16 from which depend skirt members 18, as best shown in FIG. 3, with the lower edges of the skirt members 18 connected to the opposite edges of a bottom panel 20 of open material, such as gill netting, which extends across and encloses the bottom of the funnel assembly. The leading edge 14 of the cover is reinforced by a heavy rope which is attached to and rests upon a series of floats 22 of such size as to keep the leading edge 14 spaced generally above the surface of the water an average distance of approximately 1 foot to insure that, as the funnel assembly is towed in a direction perpendicular to the leading edge 14, the oil film will pass beneath the leading edge 14 and along the bottom of the cover 12, with the trailing portions of the cover 12 being supported by the floating film of oil. The leading edge of the bottom netting panel is likewise reinforced by a heavy rope carrying spaced weights 23 to keep it submerged. As the funnel assembly is towed, the substantial pressure of the oil and water against the tapered sides 16 of the funnel and the lesser drag of the bottom netting panel 20 will maintain the somewhat flattened conical shape of the funnel, while its flexibility will permit it to conform readily and accurately to the changing surface of the water. The bottom netting panel 20 limits outward movement of the skirt portions 18 and insures their downward extension for a sufficient depth, for example 2 to 6 feet, to entrap all of the oil which enters through the wide leading end of the funnel and prevent the escape of such oil with the water which is permitted to move freely through the bottom netting 20 and out of the funnel.

The two ends of the leading edge 14 of the funnel are connected to tow lines 24 which are provided with otter boards 25 which are provided with harnesses to keep them angled forwardly at their outer ends to convert the forward motion of the tow into outwardly directed lateral forces at the opposite ends of the leading edge 14 and thus keep the leading edge extended to maintain the shape of the funnel. The forward ends of the tow lines 24 are connected to the outer ends of outrigger booms 26 whose inner ends are pivoted on a storage barge 28 and which are braced by back stays 30 which extend between the forward end of the storage barge 28 and the outer ends of the outrigger booms 26. The forward end of the storage barge 28 is connected by a tow line 32 to a towboat 34.

At the apex of the funnel assembly is an oil sump generally designated 40 which, as best shown in FIG. 4, is a narrow, elongated enclosure effectively constituting an upwardly enlarged rearward extension of the cover 12, side skirts 18 and bottom netting 20 of the funnel. In the particular embodiment shown in FIG. 4, the sump is supported within an inflated "U" shaped float 42 similar in construction to a rubber life raft, with the sides of the float 42 supporting transversely extending vertical partitions 44 of a relatively stiff and impermeable sheet material which extend between the sides to divide the sump into a plurality of longitudinally spaced chambers. The upper edges of these partitions 44 adjoin the cover sheet 46 on top of the sump and extend downwardly into the sump to graduated depths increasing from the leading end to the trailing end of the sump. Thus, as the oil moves rearwardly into the sump, the lower edges of the successive partitions skim incremental "layers" off the top of the oil. An outlet pipe 48 extends vertically upwardly into each of the chambers, the upper ends of the pipes being held by clamps 50 which were supported on webs 52 extending transversely between the side walls of the float 42. The positions of the upper ends of the pipes 48 are graduated in height, decreasing from the leading end to the trailing end of the sump. These pipes 48 all communicate with a manifold 54, the forward end of which is connected to a flexible line 56 which extends forwardly to a pump 58 located on the storage barge 28 to move the oil from the sump 40 to the storage barge 28.

Trailing from the outer ends of the outrigger booms 26 are a pair of hollow flexible tubular pipes 60, closed at each end to keep out the water and maintain their buoyancy and insure that they will float along the surface of the water. These pipes are of a substantial diameter, for example 6 inches, and serve the purpose of guiding the film of oil inwardly toward the leading edge 14 of the funnel assembly 10 to prevent the oil from being spread beyond the ends of the funnel assembly by the wake of the tow boat 34 and storage barge 28.

As will be appreciated from the foregoing description, as the apparatus is towed by a tow boat 34, to practice the method of the invention, an area of the surface of the water having a width equal to the width of the input end of the funnel assembly 10 is swept of oil. This oil is funneled rearwardly and inwardly to the sump 40. The oil film on the water may normally range in thickness from several molecules to several inches, depending upon the distance from the oil source. As the oil film is laterally concentrated toward the narrow end of the funnel assembly 10, its thickness is of course increased, perhaps to as much as several feet. Due to the buoyancy of the oil, the upper portion of this oil mass may extend as much as a foot above the surface of the water and several feet below the surface. The flexibility of the cover members 12 and 46 is sufficient to accommodate this upward bulging of the oil mass, while the skirts 18 extend downwardly beneath the surface a sufficient depth to trap all of the oil and channel it rearwardly into the sump 40 where it is removed through the pipes 48 and 56 as fast as it accumulates. This provides a continuous and rapid oil removal method of operation which can continue uninterruptedly until the storage barge is filled or even longer by providing means for pumping the oil through a flexible pipe from the storage barge to another vessel moving on a parallel course alongside the storage barge while the sweeping operation continues, in the same fashion as the refueling of ships by a tanker while underway.

While the arrangement of the partitions 44 and the inlet ends of the pipes 48 in the sump 40 will result in a high oil/water ratio in the liquid removed to the storage barge, under conditions of extreme choppiness resulting in turbulent mixing of oil and water within the sump, a higher percentage of water may be received at the storage barge. Under such conditions it is desirable to provide an oil/water separator on the storage barge. Thus the water can be separated from the oil and discharged back into the main body of water so that only the oil is retained in the storage barge.

Although the funnel covers a large area, its light weight and flexibility and low water resistance limits the strain which is imposed upon it, and renders the apparatus practical and durable. Preferably the apparatus is towed at a relatively slow speed, on the order of 3 knots, to limit the strain upon it, as well as to insure capture of substantially all the oil in the area swept. However, because of the considerable width of the funnel, it is possible to sweep a large area in a short time.

FIG. 5 shows an alternative embodiment of the invention in which three smaller funnel assemblies similar in construction to that shown in FIGS. 1–4 are towed by a single tow boat using outrigger booms 26' and back stops 30' on the storage barge 28 with the three oil lines 56 extending respectively from the three sumps 40 forwardly, the center feed line 56 going directly to the storage barge 28 and the two outer feed lines 56 going forwardly to the outrigger booms 26' and along the bottom of the outrigger booms to the storage barge 28.

I claim:

1. A method for concentrating an oil film on the surface of a body of water with an assembly having a flexible cover of sheet material which has a leading edge and is substantially impervious and impermeable to oil, the bottom of said assembly being open to permit passage of water from said assembly, which method comprises the steps of:

towing said assembly in a direction perpendicular to the leading edge of said cover;

supporting the leading edge of the cover at intervals along the length thereof to maintain the leading edge above the surface of the oil film while towing said assembly to confine the oil beneath the surface of the cover;

concentrating the oil toward the trailing end of the assembly; and allowing water to pass from the assembly through the bottom thereof.

2. A method for concentrating an oil film on the surface of a body of water with a tapered funnel-shaped assembly having a flexible cover of sheet material substantially impervious and impermeable to oil, the bottom of said assembly being open to permit passage of water from said assembly, and a towable sump located at the apex of said funnel assembly, which method comprises:

towing said funnel assembly in a direction perpendicular to the mouth of said funnel;

supporting the leading edge of the cover at intervals along the length thereof to maintain the leading edge above the surface of the oil film while towing said funnel assembly to confine the oil beneath the surface of the cover;

concentrating the oil toward the trailing end of the funnel assembly;

allowing water to pass from the funnel assembly through the bottom of said assembly; and collecting the concentrated oil at the sump of said funnel assembly.

3. A method of removing an oil film from the surface of a body of water as set forth in claim 2 including the steps of:

withdrawing the oil from the sump from a plurality of longitudinally spaced points;

collecting the withdrawn oil in a manifold; and pumping the oil from the manifold to a proximately located storage vessel.

4. A method of removing an oil film from the surface of a body of water as set forth in claim 3 wherein oil is withdrawn from the sump at points which are at different graduated levels decreasing in height from the leading end toward the trailing end of the sump.

5. A method of removing an oil film from the surface of a body of water as set forth in claim 3 wherein oil is withdrawn from points which are each located in separate longitudinally spaced chambers.

6. A method of removing an oil film from the surface of a body of water as set forth in claim 3 which includes the additional step of:

towing a storage vessel between the funnel assembly and the vessel towing said assembly to serve as a reservoir for the oil pumped from the sump.

7. A funnel assembly for skimming an oil film from the surface of a body of water comprising:

a tapered cover of flexible sheet material substantially impervious and impermeable to oil; and skirt portions extending from the trailing tapered edges of said cover, said skirt portions extending down below the surface of the water for enclosing said oil and directing the oil toward the apex end of said tapered cover, as the funnel is towed in a direction perpendicular to the leading edge.

8. A funnel assembly for skimming an oil film from the surface of a body of water as set forth in claim 7 which also includes:
   float means along the wide end of said tapered cover to keep the leading edge spaced above the surface of the water.

9. A funnel assembly for skimming an oil film from the surface of a body of water as set forth in claim 8 which also includes:
   a bottom member freely permeable to water underlying said cover and secured to the edges of said skirt portions to limit their outward movement and assure their extension downwardly into the water.

10. A funnel assembly for skimming an oil film from the surface of a body of water as set forth in claim 8 which also includes:
    a sump located at the apex end of said tapered cover to receive the oil skimmed from the surface by the funnel.

11. A funnel assembly for skimming an oil film from the surface of a body of water as set forth in claim 9 wherein said bottom member is made of netting.

12. A funnel assembly for skimming an oil film from the surface of a body of water as set forth in claim 8 which also includes:
    means for keeping the leading edges of said funnel assembly extended laterally.

13. A funnel assembly for skimming an oil film from the surface of a body of water as set forth in claim 12 wherein said means for keeping the leading edges of said funnel assembly extended laterally includes otterboards attached at the outer ends of said leading edge and oriented to convert forward motion of said funnel assembly into outwardly directed lateral forces at the ends of the leading edge.

14. A funnel assembly for skimming an oil film from the surface of a body of water as set forth in claim 10 wherein said sump includes a narrow enclosure effectively constituting rearward extensions of said cover and said skirt portions with the forward end of said enclosure communicating with the narrow apex end of said funnel assembly and with said skirt portion extending around the rearward end of said sump to close the same, while leaving the bottom of said sump open to allow the escape of water beneath the oil collected.

15. A funnel assembly for skimming an oil film from the surface of a body of water as set forth in claim 13 wherein said sump includes vertical partitions connected to and extending transversly between said skirt portions to divide said enclosure into a plurality of longitudinally spaced chambers, and wherein a plurality of outlet tubes extend vertically upward, one in each of said chambers, to predetermined levels, with said outlet tubes being connected to said fluid lines for drawing oil from the upper portions of said chambers into said fluid lines.

16. A funnel assembly for skimming an oil film from the surface of a body of water as set forth in claim 15 wherein the lower edges of said partitions and the upper ends of said outlet tubes are positioned at graduated levels, decreasing in height from the leading end toward the trailing end of said sump.

17. An assembly for concentrating an oil film on the surface of a body of water comprising:
    a cover of flexible sheet material substantially impervious and impermeable to oil;
    means for supporting said cover above the surface of the water, and
    skirt portions extending from the edges of said cover down below the surface of the water to enclose oil passing under said cover when the assembly is towed in a direction perpendicular to the opening, and directing the oil toward the trailing end of the cover.

18. An assembly for concentrating an oil film on the surface of a body of water as set forth in claim 17 wherein said cover is funnel shaped, the opening in said skirt portions forms the mouth of the funnel and oil is directed toward the apex of the funnel.

19. An assembly for concentrating an oil film on the surface of a body of water as set forth in claim 18 which also includes a sump located at the trailing end of said cover.

* * * * *